(12) United States Patent
Barrasso et al.

(10) Patent No.: US 11,790,177 B1
(45) Date of Patent: Oct. 17, 2023

(54) COMMUNICATION CLASSIFICATION AND ESCALATION USING MACHINE LEARNING MODEL

(71) Applicant: Securus Technologies, LLC, Carrollton, TX (US)

(72) Inventors: Charles Barrasso, Franklin, MA (US); Kenneth H. Sinclair, Newton, MA (US); Jeremy Moody, Waban, MA (US)

(73) Assignee: Securus Technologies, LLC, Carrollton, TX (US)

( * ) Notice: Subject to any disclaimer, the term of this patent is extended or adjusted under 35 U.S.C. 154(b) by 405 days.

(21) Appl. No.: 17/127,031

(22) Filed: Dec. 18, 2020

(51) Int. Cl.
*G06F 40/30* (2020.01)
*G06F 16/248* (2019.01)
*G06N 20/00* (2019.01)
*G06Q 50/26* (2012.01)
*G06F 40/279* (2020.01)
*H04M 3/22* (2006.01)
*G06V 20/40* (2022.01)
*G10L 15/26* (2006.01)
*G10L 15/22* (2006.01)

(52) U.S. Cl.
CPC ............ *G06F 40/30* (2020.01); *G06F 16/248* (2019.01); *G06F 40/279* (2020.01); *G06N 20/00* (2019.01); *G06Q 50/26* (2013.01); *G06V 20/41* (2022.01); *H04M 3/2281* (2013.01); *G06V 20/44* (2022.01); *G10L 15/22* (2013.01); *G10L 15/26* (2013.01)

(58) Field of Classification Search
None
See application file for complete search history.

(56) References Cited

U.S. PATENT DOCUMENTS

| | | | | |
|---|---|---|---|---|
| 7,860,722 B1 * | 12/2010 | Chow | ................. | H04M 3/2281 379/88.04 |
| 10,447,968 B1 * | 10/2019 | Passe | ..................... | H04N 7/147 |
| 10,757,058 B2 * | 8/2020 | Baracaldo Angel | ......................... | H04L 63/1416 |
| 11,599,890 B1 * | 3/2023 | Kalaboukis | ........... | H04M 1/663 |

* cited by examiner

*Primary Examiner* — Nafiz E Hoque
(74) *Attorney, Agent, or Firm* — Fogarty LLP

(57) ABSTRACT

Systems and methods are disclosed for communication classification and escalation using a machine learning model. Metadata for a communication is obtained along with features of the content in the communication. Using a machine learning model, a likelihood that the communication comprises suspicious content or a topic of interest is determined from the metadata and or a communication transcript. If the likelihood that the communication comprises suspicious content or a topic of interest is at or above a predetermined threshold, then the communication is marked for review by a human agent; otherwise, the communication is ignored. A communication may have suspicious content or a topic of interest based upon the presence of keywords in the communication transcript either alone or in combined with metadata or other features of the content in the communication. The one or more keywords may be associated with illegal or unauthorized items, activities, or behaviors.

20 Claims, 8 Drawing Sheets

COMMUNICATION CLASSIFICATION AND ESCALATION USING MACHINE LEARNING MODEL

BACKGROUND

Communication with family, friends, and others is important to those who are incarcerated. By allowing inmates to have some contact with friends and family while incarcerated, the justice system aims to facilitate their transition back into society upon release. Traditional forms of contact include telephone calls and in-person visitation. More recently, technological advances have allowed jails and prisons to provide other types of visitation, including individual-to-individual videoconferences, which may be typically referred to as "video visitation," and online chat sessions. Other communication types include, email/messaging, video gram, VRS (video relay service), and scanned physical letters. Typically, these communications are allowed for inmates with good behavior. However, inmates on a restricted status or assigned to a segregation unit may have limited access to the telephone.

Unfortunately, some inmates take advantage of outside communications and use these communications to plan or direct illegal activity or to threaten victims or witnesses. Other inmates may express concerns to friends and family during communications, such as threats, attacks, or intimidation by fellow inmates. Inmates may also discuss the presence of contraband items in the facility, such as mobile phones and drugs. It is important for overall inmate safety and facility security to identify such events. Although a called party, such as a threatened witness, may report suspicious or offensive calls, most suspicious calls go unreported. Accordingly, there is a need to monitor inmate communications for suspicious activity and gathering intelligence.

SUMMARY

Systems and methods for communication classification and escalation using a machine learning model are disclosed.

In one embodiment, a computer-implemented method comprises obtaining metadata for a communication, obtaining features of the content in the communication, and determining from the metadata and or a communication transcript, using a machine learning model, a likelihood that the communication comprises suspicious content or a topic of interest. The method further comprises, if the likelihood that the communication comprises suspicious content or a topic of interest is at or above a predetermined threshold, then marking the communication for review by a human agent, and, if the likelihood that the communication comprises suspicious content or topic of interest is below a predetermined threshold, then ignoring the communication for further review. A communication may be determined to have suspicious content or a topic of interest based upon the presence of one or more keywords in the communication transcript either alone or combined with metadata or other features of the content in the communication. The one or more keywords may be associated with illegal or unauthorized items, activities, or behaviors. The metadata may be associated with at least one of a communication parameter and a party to the communication.

The method may further comprise providing data from human agent reviews of prior communications as training data for the machine learning model, wherein the model is configured to process the communication in accordance with current values of a set of model parameters to generate as output a proposed likelihood that the communication comprises suspicious content. The data from human agent reviews may comprise one or more of new keywords assigned to prior communications, an indication whether a prior communication was escalated by the human agent, and whether the suspicious content or a topic of interest produced by the machine learning system was confirmed.

The method may further comprise providing data from an end-user interface as training data for the machine learning model, wherein the model is configured to process the communications in accordance with current values of a set of model parameters to generate as output a proposed likelihood that the communication comprises suspicious content or a topic of interest. The data from the end-user interface may comprise search parameters entered by a user or search results selected by a user.

The method may further comprise providing one or more communication summaries as training data for the machine learning model, wherein the model is configured to process the communications in accordance with current values of a set of model parameters to generate as output a proposed likelihood that the communication comprises suspicious content or a topic of interest. The one or more communication summaries may comprise topics or subject matter discussed in prior communications.

In another embodiment, a method performed by one or more data processing apparatuses comprises obtaining data from human agent reviews of communications recorded in one or more controlled-environment facilities and providing the data from human agent reviews as training data for a machine learning model. The model is configured to process communications recorded in controlled-environment facilities in accordance with current values of a set of model parameters to determine a likelihood that the communications comprise suspicious content or topics of interest. The machine learning model may determine the likelihood of suspicious content based upon metadata and transcripts associated with the communications and/or video images associated with the communications The method may further comprise, if the likelihood that the communication comprises suspicious content or a topic of interest is at or above a predetermined threshold, then sending the communication to a human agent for review; and if the likelihood that the communication comprises suspicious content or a topic of interest is below the predetermined threshold, then dropping the communication from further review. The data from human agent reviews may comprise one or more of new keywords assigned to prior communications, an indication whether a prior communication was escalated by the human agent, and an indication whether an expected party to a prior communication was confirmed. The communication may be determined to have suspicious content or a topic of interest based upon the presence of one or more keywords in a communication transcript or based upon detection of events in a participant video stream.

The method may further comprise providing data from an end-user interface as an input to the machine learning model, wherein the data from the end-user interface comprises one or more of search parameters entered by a user and search results selected by the user.

The method may further comprise providing one or more communication summaries as an input to the machine learning model, wherein the one or more communication summaries comprise topics or subject matter discussed in prior communications.

BRIEF DESCRIPTION OF THE DRAWINGS

Figure 1:
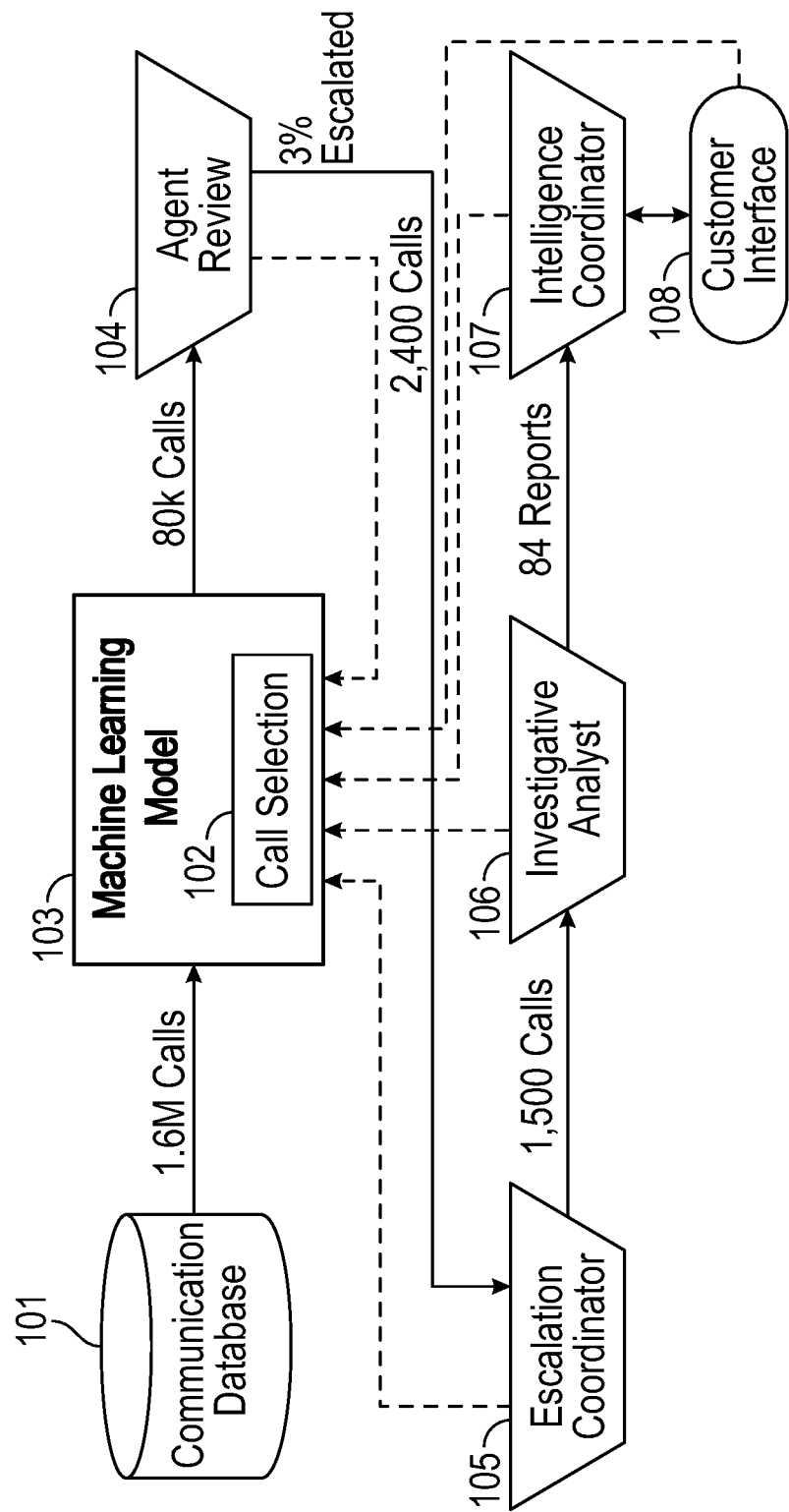

Having thus described the invention in general terms, reference will now be made to the accompanying drawings, which are not necessarily drawn to scale, and wherein:

FIG. 1 is a flowchart illustrating a communication monitoring process according to an example embodiment.

Figure 2:
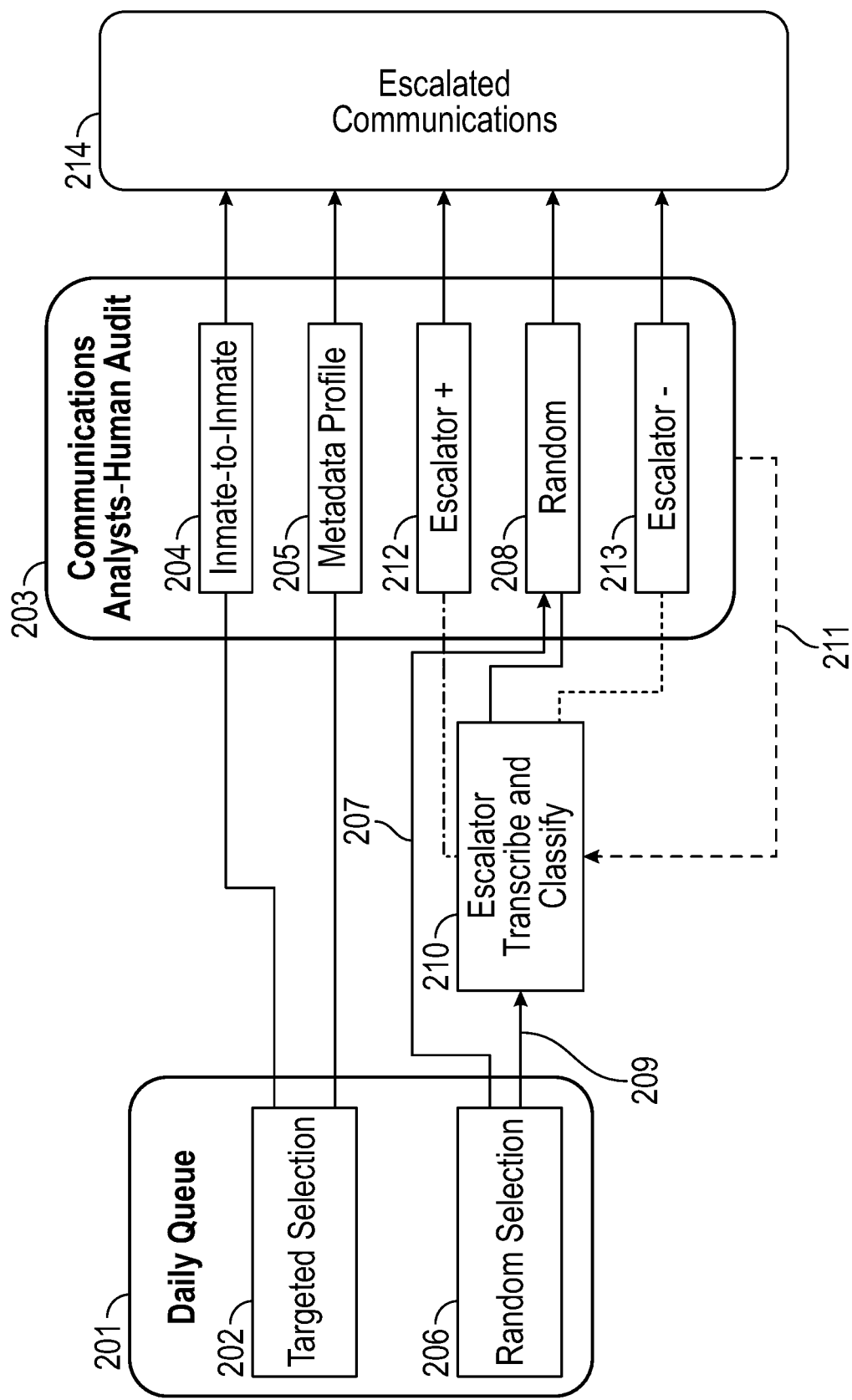

FIG. 2 is a block diagram depicting how communications are escalated according to an example embodiment.

Figure 3:
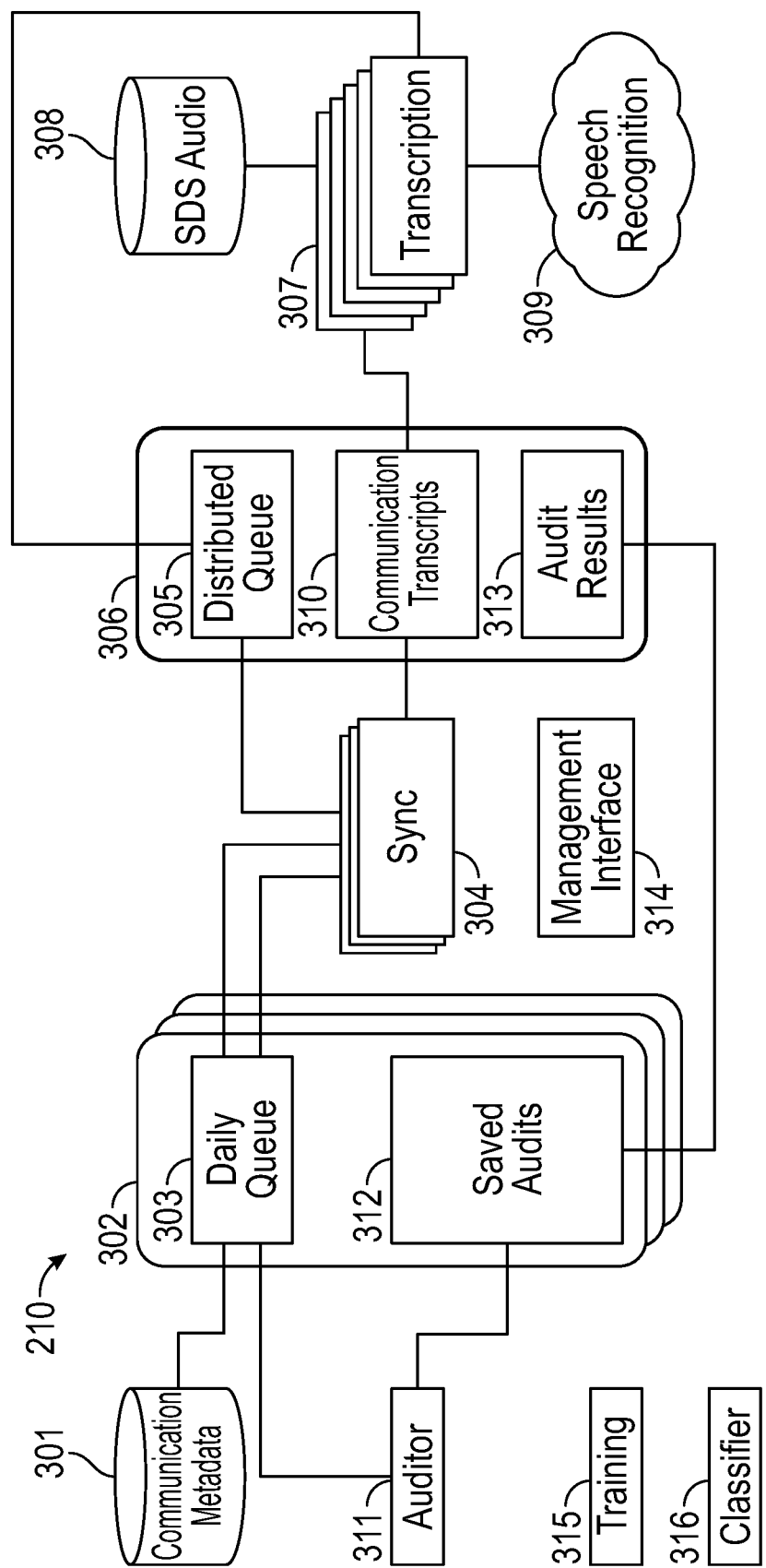

FIG. 3 is a block diagram depicting the architecture and functionality of a machine learning system according to an example embodiment.

Figure 4:
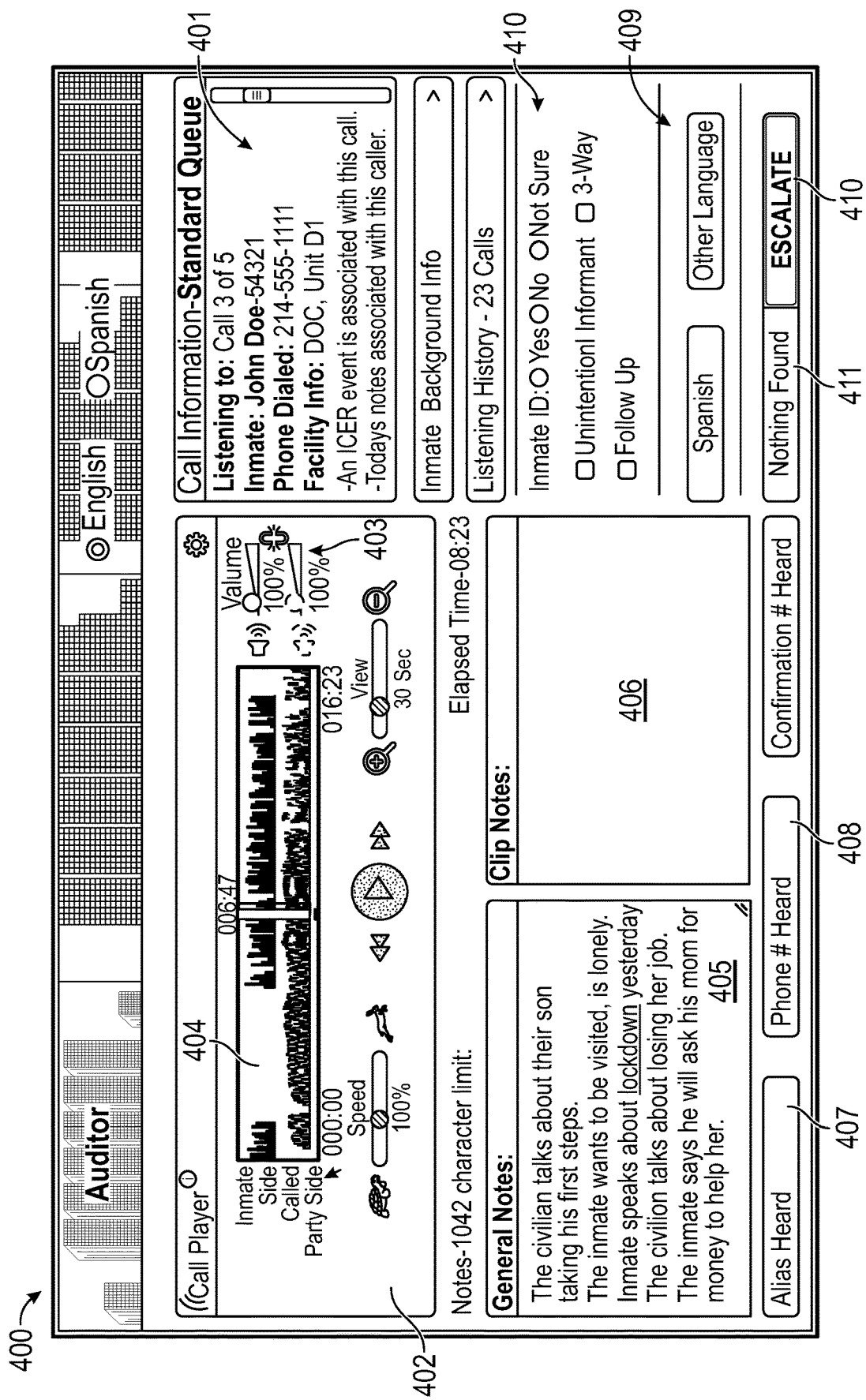

FIG. 4 illustrates a user interface for an auditor application according to an example embodiment.

Figure 5:
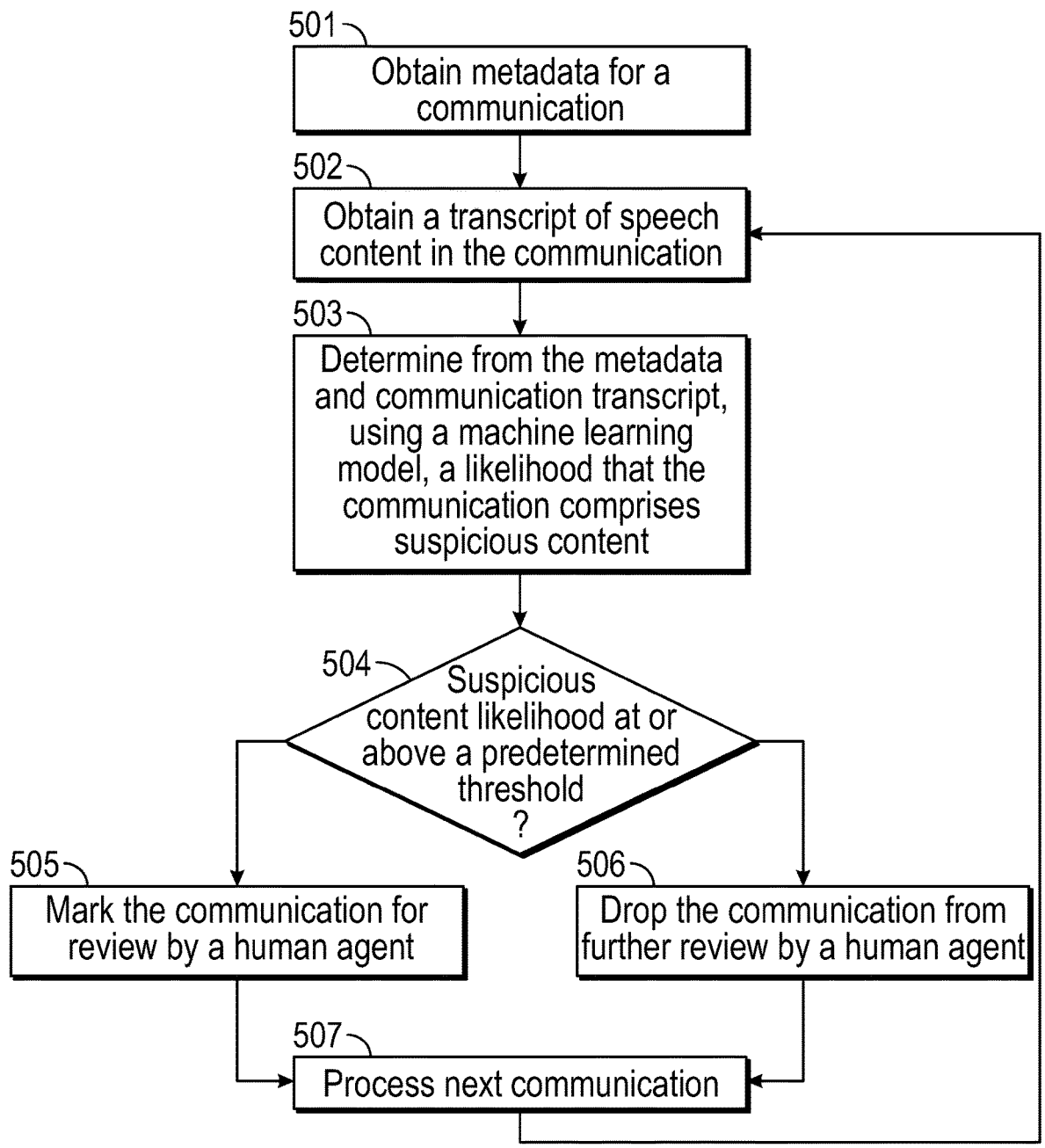

FIG. 5 is a flowchart illustrating an example method for monitoring communications recorded in a controlled-environment facility.

Figure 6:
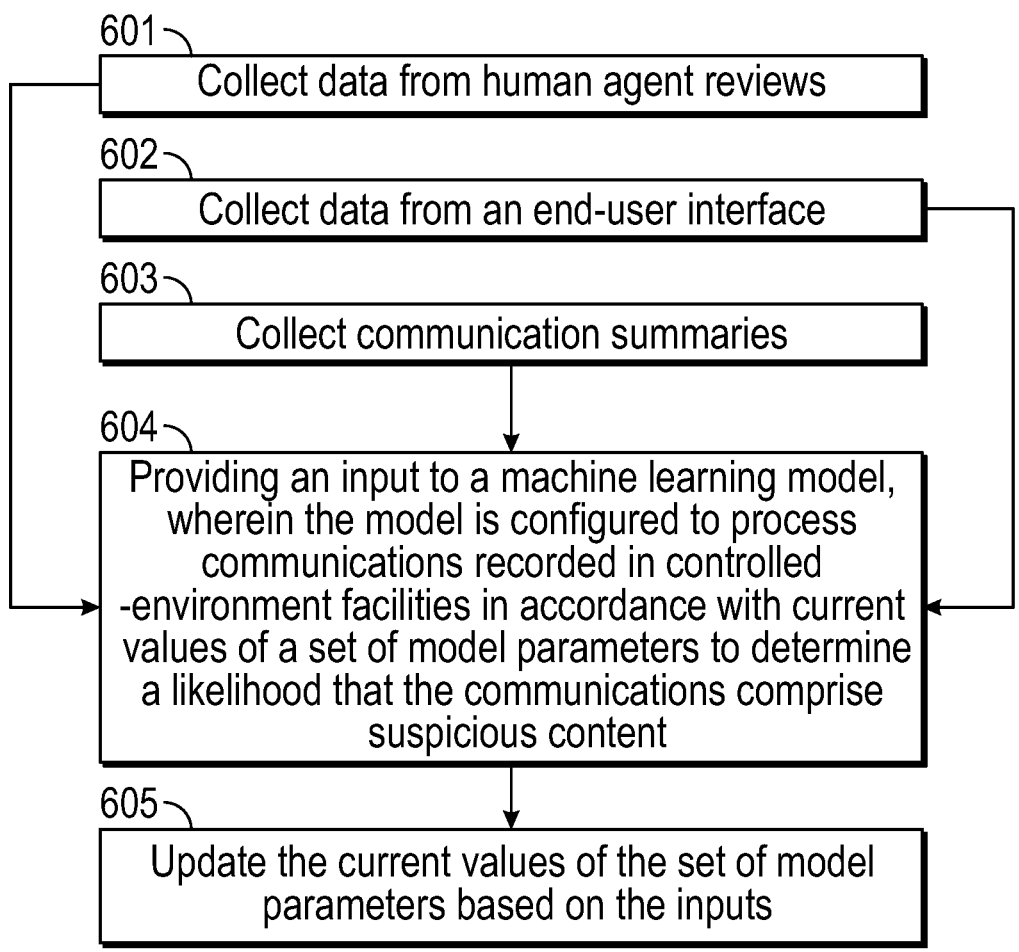

FIG. 6 is a flowchart illustrating an example method for training a machine learning model, wherein the model is configured to process communications recorded in controlled-environment facilities.

Figure 7:
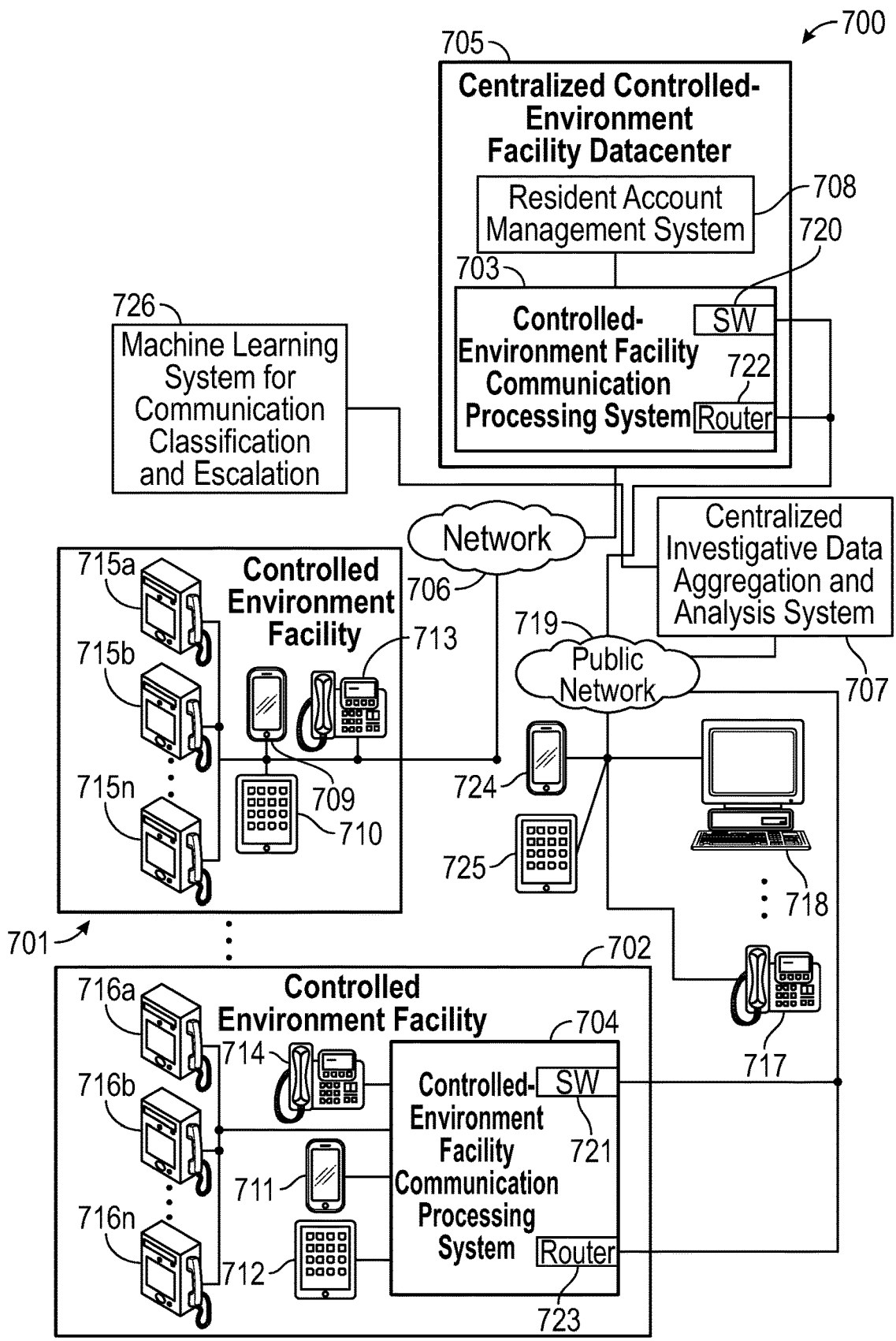

FIG. 7 is a diagrammatic illustration of a controlled-environment facility environment 700, wherein example embodiments of the present systems and methods for call classification and escalation using a machine learning system may be employed.

Figure 8:
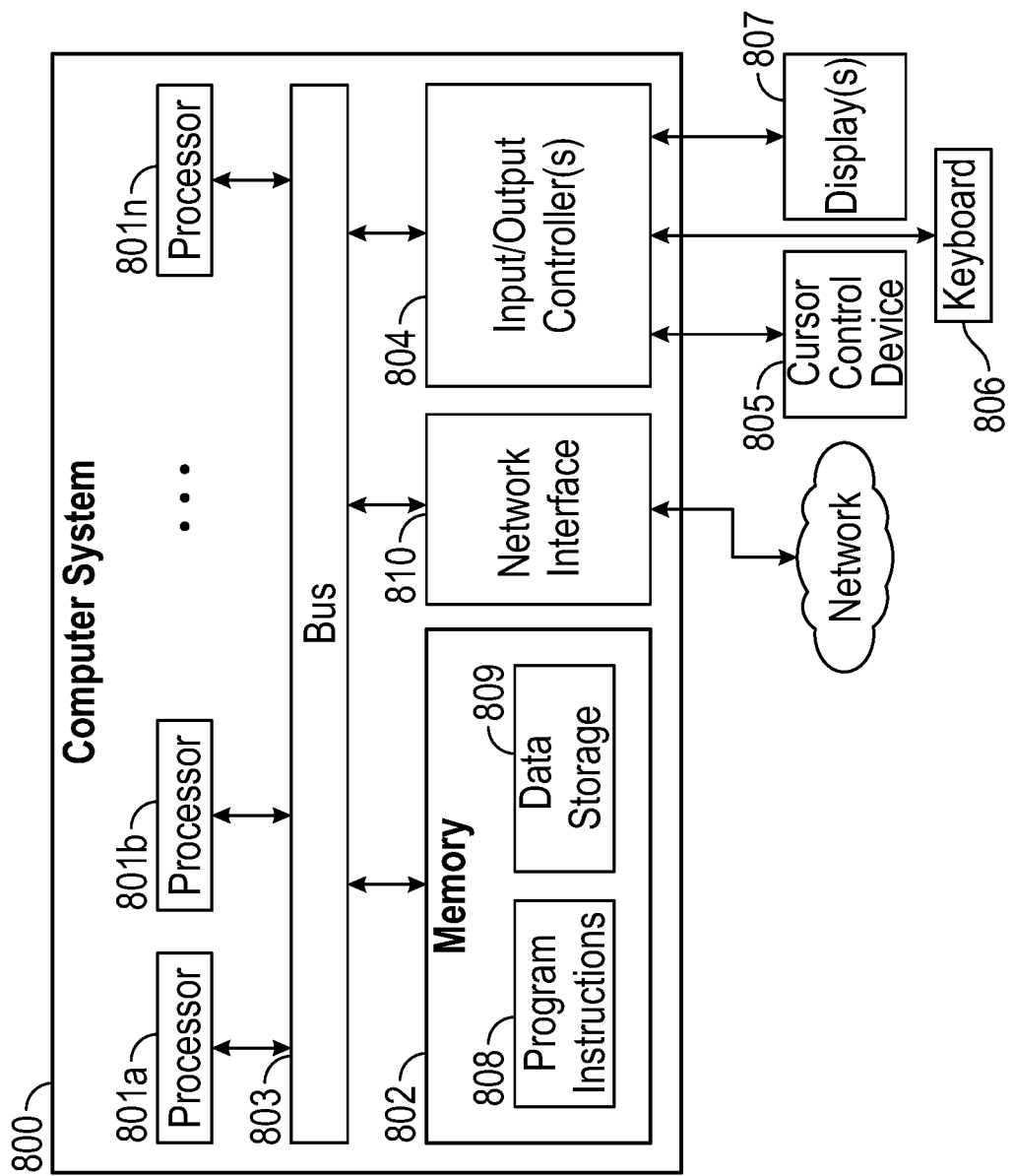

FIG. 8 is a block diagram of a computer system, device, station, or terminal configured to implement various techniques disclosed herein, according to some embodiments.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

The present disclosure relates generally to controlled-environment facilities and, more specifically, to monitoring and investigating communications, such as telephone calls or video visitation sessions, associated with residents of such facilities. As used herein, the term "controlled-environment facility" refers to any location for which there are restrictions on who can enter or leave. Additionally, there may be restrictions on what personal property, if any, is allowed within a controlled-environment facility. There are various types of controlled-environment facilities and people may be voluntary or involuntary residents of such facilities, whether temporarily or permanently. For example, controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, schools, dormitories, barracks, etc.), and the like. As used herein, the term "resident" as applied to a controlled-environment facility refers to any person within such facilities voluntarily or involuntarily and temporarily or permanently. For example, residents may include inmates, prisoners, guards, and staff in correctional institutions, patients, doctors, nurses, and other medical staff in healthcare facilities, and students, teachers, and counselors in restricted living quarters.

For convenience of explanation, the various examples discussed herein are presented in the context of communications from correctional facilities or the like. For instance, in some of the embodiments discussed below, a controlled-environment facility may be referred to as a correctional facility, jail, or prison, and its residents may be referred to as inmates, prisoners, arrestees, or detainees. It should be understood, however, that the systems and methods described herein may be similarly applicable to other types of controlled-environment facilities and their respective residents. Moreover, the systems and methods described herein may be used to support communications in other facilities that have fewer or no access restrictions. Furthermore, although the example embodiments are directed to telephone calls, the monitoring and call selection methods disclosed herein are equally applicable to video visitation, teleconferences, electronic mail, messaging, or other forms of communication that can be captured in a searchable format. Telephones are often available throughout a correctional facility for inmates to make calls. The telephones are programmed to process collect calls, debit calls or prepaid calls. In some facilities, inmates are required to use a personal identification number (PIN) or other authentication method in an automated security system to use a phone, tablet, or video kiosk. This allows the communications recording and monitoring system to associate each communication with a particular inmate. Calls may also be associated with a specific called or bill to number (BTN).

Communications by inmates of correctional facilities are often monitored for the collection, analysis, and/or reporting of information for intelligence purposes. In some embodiments, an investigative service may provide functions such as communication behavior analysis, correlations, mapping, word search, language translation (whether machine translation or access to translation services), communication recording (whether terminated external to the correctional facility or internally thereto), communication notification, communication monitoring (whether real-time or recorded, and whether monitoring a particular communication or a plurality of communications), call control, visitation monitoring/background checking, multiple database querying, and resource integration, and/or the like. The investigative service may be located at the correctional facility or a centrally located service may be used to monitor and analyze communications for multiple facilities. A single department of corrections may generate millions of communications per month across multiple facilities. Accordingly, due to the sheer number of inmate communications, there is a need to automatically filter inmate communications for further investigation. Often, the inmate communications are recorded and then filtered and analyzed at a later time; however, in some embodiments, communications may be monitored and filtered in real time.

Communications may be selected for monitoring and analysis either randomly or in a directed way, such as when there is intelligence about a particular inmate, living unit, called party, BTN, or the like. Alternatively, if no target inmates are selected for monitoring, a communication investigation service may use its knowledge, intelligence, experience, and technology to systematically select communications for monitoring and further investigation. For example, an algorithm may be applied to speech transcripts of inmate communications in order to select communications for monitoring based upon communication metadata (e.g., suspicious called number) or based on content (e.g., the occurrence of certain keywords). The selected communications may then be reviewed by an agent or investigator and labeled to identify relevant content. The review of the selected communications may result in an inmate being put on a watchlist or subject to targeted requests for monitoring future communications.

The filtering algorithm is designed to improve the likelihood of identifying suspicious activity among all the inmate communications, such as by looking for keywords in the speech transcripts of the communications. In one embodiment, the algorithm may use artificial intelligence (AI) applied to speech transcripts from the inmate communications. The data labels applied by agents to the selected communications may be used as feedback to train the machine learning system so that the machine learning system is always learning and staying current with relevant keywords, timing, phrases, or the vocabulary as a whole or the like.

In a further embodiment, a user interface allows users, such as investigators and correctional facility staff or a third party service to filter inmate communications and retrieve potential communications of interest. For example, communications may be filtered using keywords found in the speech transcript or using communication metadata such as a party, living unit, or time associated with a communication. A list of communications of interest is provided to the user, who may then select certain communications for further review. This selection by the user provides an additional feedback loop to the machine learning system to help identify what content is of interest.

Another embodiment creates conversation summaries and identifies topics of conversation in inmate communications. These topics may be analyzed to identify which topics are currently of most interest to inmates. Trending topics among individual inmates, living units, and/or the facility may be identified and used as indicators of the current mood of the facility and to identify unrest or agitation among the inmate population. These topics could be used as a filter to search communications containing specific topics. These topics may also provide intelligence to the facility staff.

More generally, each feature of a communication, such as participant audio (e.g., content transcript, volume, tone), background audio, participant video, background video, metadata, billing data, etc., may be selected, highlighted, or commented by a user or analyst. User and analyst feedback is used as training data for a machine learning model to identify future communications that may contain suspicious subject matter.

FIG. 1 is a flowchart illustrating a communication monitoring process according to an example embodiment. Communication database 101 stores the communication records for one or more correctional facilities. Communication database 101 may be centrally located or may be located at a correctional facility. The call records in communication database 101 may comprise, for example, both an audio file for a communication (e.g., a WAV or MP3 file) and a transcript of the speech in the audio file (e.g., a text file) along with communication metadata, such as an inmate identifier, biometric, calling number, called number, BTN, date/time of communication, communication duration, charge type (e.g., collect, prepaid, debit), charge amount, known or suspected gang affiliations with an identified phone number or the like. Additional data from other sources and applications may also be associated with each communication record. Communication data may also include video metadata, which may include a visiting party's government issued license number, home address, facial recognition, or other biometrics features from either party, IP address or device type (e.g., tablet, cell phone desk top computer). Communications may be flagged as an audio or video communication between two inmates, a communication joined to a third party, a communication to a new destination number, or the like. In an example embodiment, a department of corrections may store as many as 1.6 million communications per month to communication database 101 from all of its facilities.

The communications records from database 101 go to a communication selection process 102 that filters communications based upon metadata and content to identify potentially suspicious activity and/or targeted topics. Communication selection process 102 applies an algorithm with rules that are intended to cast a wide net for identifying potential suspicious activity. Selection process 102 may include a machine learning model or system 103 that analyzes content and metadata of the individual communication. The process can tolerate a high error rate in communications selection process 102 (i.e., an over-selection of suspicious communications) because the selected communications are then monitored by human agents in block 104, which will eliminate false positives from the algorithm selection. In one embodiment, communications selection process 102 may select 5% of the communications from database 101 for further review, which results in approximately tens of thousands of communications being sent for agent review in block 104.

In addition to the data from each communication, combined patterns from multiple communications may be useful to make determinations of suspiciousness or selections of target topics for intelligence.

The agents listen to content of each communication at block 104, label each communication as appropriate, and apply rules for escalation. In one embodiment, the agents review millions of minutes of recorded communications each month with each agent reviewing more than a thousand separate communications. Again, the system accepts a high error rate and approximately 3% of the communications reviewed by agents are escalated for review by escalation coordinators in block 105. As a result, a few thousand communications are sent to the escalation coordinators.

The agent review in block 104 may include a quality assurance (QA) process in some embodiments. A first group of agents or communication analysts review and label communications from selection process 102. After the labels are applied by the first group, a second group of agents then review a carefully chosen subset of the calls again (i.e., a second review of the subset of calls). The second group of analysts may consist of the same people in the first group or may be an independent group of analysts. Where the groups overlap, the second group of analysts do not review any of their own calls from the first pass, so no calls are reviewed twice by the same person. The second team of agents may also be selected based on tenure and/or their historical labeling accuracy based on their call correction rate during an escalated double review, which is discussed below, and/or the subsample quality check.

The subset of calls for a second review may be selected, for example, based on the difference in labeling or prediction between the first agent and the machine learning model 103, such as the calls with the strongest disagreement in labels applied by the AI and the first agent. Alternatively, the calls reviewed a second time may be selected based on factors such as the speed of the review on the first pass. For example, an average review time may be compared to the review times for individual agents or individual call to identify if certain agents are going too fast or too slow, which may impact labeling accuracy. Filtering criteria may also include the length of service for agents, wherein new agents are quality checked more frequently and thoroughly.

In block 105, the escalation coordinators apply customer specific rules and prioritize the communications flagged by the agents. Approximately 60% of the flagged communications are verified for escalation, which results in more than 1000 communications being passed to investigative analysts at block 106. All of the escalated calls undergo a QA review by the investigative analysts. The investigative analysts may expand the scope of the investigation and request additional monitoring, such as a targeted request for review of additional communications by a particular inmate. The investigative analysts may apply additional tools such as THREADS™, which helps to recognize patterns and link connections, IPro™, which allows for searching by voice, and ICER™, which detects inmate-to-inmate communications. THREADS™, IPro™, and ICER™ are services available from Securus Technologies, LLC. The investigative analysts create suspicious activity reports that are passed to an intelligence coordinator at block 107. The report comprises, for example, a text document with quotations and references to individual communications that explains to the investigator the output of potentially a few hundred communications' worth of content. The intelligence coordinator then provides information to customers directly or via a customer interface 108. Additionally, more intelligence may be gained by facility based investigators including their findings and details of their review at 108.

The activity of any one or more of the reviewing agents, escalation coordinators, investigative analysts, and intelligence coordinators may be provided as feedback to the machine learning system 103 for further training and learning by the machine learning system 103. For example, the machine learning system 103 can learn and improve its selection method by observing whether selected communications are passed along by the agent and how far they are passed through the process. The data labels applied to the selected communications by the reviewing agents may also be used by the machine learning system 103 to improve its characterization of future communications and to identify updated keyword lists.

The algorithms used in communication selection process 102 are initially based upon the knowledge, skills, and experience of investigators. The introduction of machine learning system 103 adds an efficiency mechanism so that the selection process 102 is enhanced with feedback. This allows the selection process to evolve continuously so that communications are selected with the highest likelihood of finding suspicious activity. In one embodiment, machine learning system 103 enhances the algorithms using the words that were actually spoken on the communication. The actual speech transcript of the communications and the labeling by the reviewing agents are used to train the machine learning system 103. This allows the machine learning system 103 to always stay on top of the current concerns of the reviewing agents, escalation coordinators, investigative analysts, and intelligence coordinators when selecting communications.

In another embodiment the machine learning system 103 may use any content, metadata, human labeling, or the like to train the machine learning system to improve the accuracy of results. The tone of the voice (e.g., whispering or screaming) may indicate suspicious or targeted activity. The biometric indications of the parties involved such as covert hand signals may be used to train the machine learning system.

The communication monitoring process does not rely on the machine learning system to be completely accurate since the selected communications are further reviewed at later stages. The machine learning system 103 is a statistical system that makes a judgment based on correlated factors on which it has been trained. The machine learning system 103 produces a probabilistic output that indicates the degree to which a selected communication is suspicious or otherwise meets criteria or a topic of interest. Accordingly, the output of the machine learning system will include some degree of false positives, incorrect judgments, incorrect classifications, and/or false negatives. However, the machine learning system does improve the efficiency of the communication selection process which has a high error level because less than one percent of the total communications reviewed are actually suspicious or contain criteria or a topic of interest. The same machine learning system, trained the same way, can be set to a different threshold at a different operating point in the process. For example, the end results might be only shown to the customer at block 108 if a communication is 50 percent suspicious or the criteria or a topic of interest or 90 percent suspicious or criteria or a topic of interest or some other threshold.

FIG. 2 is a block diagram depicting how communications are escalated according to an example embodiment. A daily queue 201 of new inmate communications are received. A first group of communications 202 are targeted for human audit 203 by a communications analyst. The targeted communications include, for example, inmate-to-inmate communications 204 and communications that meet predefined metadata profiles 205. Another group of random communications 206 are also selected and forwarded for human audit 203. A first collection 207 of the random communication selection is passed directly for audit 208. The remaining random communications 209 are processed by an escalator 210 that transcribes and classifies the communications. The escalator 210 may be a machine learning system that continually trains on feedback from the human audit 203 and other communications reviews.

The system is flexible and configurable so that the number or percentage of communications that are reviewed may be selected based upon the facility, communication type, time of day, duration of the communication, calendar dates (e.g., weekends, weekdays, holidays), or any other appropriate parameter.

Escalator 210 transcribes each recorded communication and creates a speech transcript for the communication. The transcription may be created locally by the Escalator or by a remote or third-party transcription service. Escalator 210 classifies the communication with a machine learning model. Escalator 210 may further classify the communication by identifying relationships between keywords and metadata based upon machine learning using feedback 211 from the human audit 203. Escalator 210 may rank or prioritize communication for review by the communication analysts by assigning communication to a higher 212, neutral 208, or low 213 priority for audit. It will be understood that in other embodiments there may be more than three levels of prioritization for communication auditing.

One or more communications analysts audit the selected communication groups 204, 205, 208, 212, and 213 by listening to or watching the entire communication. The analysts then determine whether each individual communication should be escalated for further review by another analyst or by an escalation coordinator. The escalated communications 214 may be annotated with communication summaries or data labels and passed on for higher review. The list of escalated communications 214 and audited non-escalated communications along with assigned data labels and other metadata may be fed back to 211 to Escalator 210 as a data set for further training of the machine learning model.

The Escalator 210 provides speech/video recognition (e.g., Optical Character Recognition (OCR)) of inmate communications plus machine learning decision that can materially improve the productivity of first-level communication analysts (i.e., human listeners). Machine classification tasks do not need 100% accurate transcription to produce useful results, but the results improve with more accurate transcripts.

FIG. 3 is a block diagram depicting the architecture and functionality of a machine learning escalator 210 (FIG. 2) according to an example embodiment. Metadata 301 is generated for each recorded inmate communications. The metadata 301 is passed to a database 302 and stored to a daily queue 303. A separate database 302 may be used for each correctional facility that is being processed using escalator 210. The metadata 301 in daily queue 303 is processed using a Sync application 304, which may be, for example, a Python program that selects input communications, requests audits, and syncs the results. A separate instance of Sync application 304 may exist for each facility and each database 302.

The communications are then assigned to a distributed queue 305 in an escalator database 306. The queued communications are processed using a communication extraction feature using a Transcription (e.g., recognition) application 307. The Transcription application 307 may be a Python program that retrieves, transcribes, and classifies communications. A plurality of instances of the Transcription (recognition) application 307 may run simultaneously on different processors to improve throughput in the system.

Transcription (recognition) application 307 retrieves the contents of the communicator associated to the metadata for that communication using a Streaming Delivery Service (SDS) to access files stored in a digital repository service 308. The audio files are transcribed using a speech recognition service 309, which may be a local application or a remote, third-party service. The transcripts 310 are then saved to database 305. Sync application 304 requests audits for the transcripts in cooperation with Auditor application 311, which may provide an interface to communications analysts or other human auditors. During the audit, data labels may be assigned to the transcript along with a summary or other information. The audits 312 are saved to facility database 302 and the audit results 313 passed to escalator database 306.

In other embodiments, the transcription (recognition) application 307 may retrieve video. It may recognize facial features, identify illicit material such as drugs, guns, bombs, messages conveyed visually using printed or handwritten or photographic media, covert hand signals, etc.

The machine learning escalator 210 also has a management interface 314 to allow for configuration of the system. A training application 315 is used to train the classifier based on previous audits. The training application 315 may function while the machine learning escalator 210 is operating (i.e., filtering communication records) and/or when the system is offline.

Machine learning classifier 316 trains the system by using the monitored results from saved audits 312 and the annotations from the machine learning system to constantly improve itself.

FIG. 4 illustrates a user interface 400 for an auditor application according to an example embodiment. User interface 400 has a communications information area 401 that identifies the inmate, number dialed, facility and residence unit along with other communication information.

In one embodiment, communications player section 402 allows an analyst or other user to control playback of the audio from a recorded inmate communication. The inmate/facility side of the communication is recorded separately from the called party/remote side of the communication. Accordingly, the volume for both sides of the communication can be separately controlled, which allows the user to isolate either party's audio. Both sides of the communication are separately transcribed, which ensures that both speakers' words are captured since there is no overlap in the audio file. Additionally, audio level display 404 indicates which party is talking at any time during the communication.

It will be understood that communication player 402 illustrates an audio-only call to simplify the diagram. In other embodiments, user interface 400 may allow an analyst or other user to view and control playback of other communication content. For example, communication player section 402 may provide for playback of video separately from both the inmate and remote party sides of a communication. The participant video may be played at different speeds (e.g., fast forward or rewind at 0.5, 2, 3, or more times normal speed). Frame-by-frame view of the video may also be selected. A slider may allow the participant video playback to be moved to a desired event or time. The video content playback may be coordinated with the audio level display 404 so that selection of particular video or audio content causes the other content to match during playback.

The analyst may provide general communication notes in section 405, such as a general summary of the communication and topics discussed. Clip notes may be included in section 406 to annotate specific segments of the communication. Additional fields allow the analyst to indicate specific aliases 407, telephone numbers 408, that are mentioned. The analyst may also indicate 409 whether Spanish or some language other than English was used on the communication. The identity of the inmate may be confirmed or questioned by the analyst and then noted on the user interface in section 410. Inmates may use a PIN or other means of identification to initiate communications, thereby each communication record is associated with a particular inmate by the PIN. However, PIN misuse and fraud may occur when one inmate uses another's PIN either with or without permission. When the inmate voice is confirmed, the auditor information may feedback to other applications, such as a voice recognition program.

Additional fields may be included in the auditor user interface, such as keywords and synonyms for keywords. Those fields may be populated by the analyst or by investigators at the facility, for example. The occurrence of each keyword may be linked to a specific time in the communication so that the user may jump directly to that portion of the communication. If the content of the communication meets specific criteria that is determined to be suspicious or having a topic or criteria of interest, the analyst may select an "escalate" button 410 to send the communication to an escalation coordinator for further review. Once the communication is determined by the analyst to have met the criteria, the escalation coordinator may select, such as using a drop-down menu, the criteria that identifies the reason the communication has been determined suspicious or the topic or criteria of interest. The analyst is prompted to select one or more of the criteria. For example, the communication may discuss contraband and a cell phone. If both of the criteria are met, the analyst would select contraband then may drill down to a specific "cell phone" label. Alternatively, if no suspicious activity is noted, the analyst may drop the communication from review by selecting a "nothing found" button 411. The information recorded via the user interface 400 is linked to the communication record and is available to any other analysts or investigators who review the communication.

The machine learning system may populate the initial state of the user interface based upon analysis of the machine learning transcript and the metadata. Alternatively, or additionally, the user interface data may be provided as feedback to the system as a learning data set to train the machine learning model. For example, if the user adds a keyword for drugs, whether it is the name of a new drug or a synonym for an existing drug, then that information will be fed back to the machine learning model, which will learn the new keyword. Accordingly, without specifically updating the list of drug keywords, the machine learning system will learn the new keyword based upon the information provided by the analyst. When analyzing the user interface data, the machine learning system may also identify keywords that are more or less likely to cause a communication to be escalated by the analyst. The machine learning system could then infer the words spoken in communication or that are noted by the analyst are synonyms for illicit paraphilia.

In one embodiment, the machine learning system is configured to filter communications records using learned attributes and context information, wherein the learned attributes are based upon feedback provided to the machine learning system as data entered by analysts on a communication audit interface. The data entered by the analyst may comprise, for example, new keywords, keyword synonyms, inmate identification, communication summaries, communication topics, and/or escalation of communications for further review. The machine learning system may gather analyst audit data for a period of time and use the gathered data to determine, using a machine learning algorithm, the likelihood that a new communication contains suspicious content. For example, the machine learning system may include routines that, upon execution, configure the machine learning system to learn and get inputs from audit data, metadata, and/or communication context. In some cases, such inputs may be gathered and placed in a repository for training. The machine learning system may be configured to train or invoke training of a machine language and inference parameterization, and to produce data structures in any format (e.g., JavaScript Object Notation or JSON schema, XML, files, etc.) suitable for consumption and use in future communication filtering.

The machine learning system may use different classifier variations. Classification features may include, for example, bag of words (unordered communication vocabulary) or sequence of words, phrase timing, pause durations, turn-taking, and variations in speech rate, amplitude, pitch, or frequency, distinctive patterns of noise (e.g., environmental noise, gun shots, vehicle noises, language, gender), biometric information such as biometric identity from speech, facial characteristic, or iris scan, image-related features, image content, recognized text, hand signals, emotion detection based on voice or facial features, explicit content, object detection, weapons, or contraband. Word normalization may be used, such as conventional word stemming, reducing numbers to patterns (phone, card, monetary) not specifics, reducing proper names to type, and reducing dates to type. The classifier technology may be any suitable type of artificial neural network, such as feedforward, recurrent neural network (RNN), long short-term memory (LSTM), or convolutional. Variations in architecture may include layers, activation functions, and sizes. Other variations may include linear classifier, support vector machine, and decision tree. The classifier output may comprise probability of class membership wherein the class could be just non-suspicious/suspicious, or a member of many pretrained categories of suspicious communicators or topics of interest/criteria.

The escalator machine learning system may use different training variations, such that it may train on whole-communication suspicion or several suspicious categories, train on whole-communication classes or individual phrases, train escalation classifier, or train the speech recognition system to acoustic and/or language models.

Various transcription models may be used with the escalator machine learning system, such as speech recognition, speech-to-text. The transcription may be created with a third-party service, such as Google, or using an internally developed transcriber. Similarly, the system may use recognition programs for video or other types of human language.

FIG. 5 is a flowchart illustrating an example method for monitoring communicators recorded in a controlled-environment facility. In step 501, metadata for a communication is obtained. In step 502, a transcript of speech content in the communication is obtained. In step 503, a machine learning model is used to determine a likelihood that the communication comprises suspicious content based on the metadata and communication transcript. A communication may be determined to have suspicious content, for example, based upon the presence of one or more keywords in the communication transcript. The keywords may be associated with illegal or unauthorized items, activities, and/or behaviors. The presence of keywords may be combined with the presence of selected metadata or other features of the content in the communication to evaluate the likelihood of suspicious content. The selected metadata may be associated with a communication parameter and/or a party to the communication.

In step 504, if the likelihood that the communication comprises suspicious content is at or above a predetermined threshold, then the communication is marked for review by a human agent at step 505. Additionally, the system may prioritize the communications marked for review according to the computed likelihood. Alternatively, if the likelihood that the communication comprises suspicious content is below the predetermined threshold, then the communication is ignored for further review at step 506. In either case, the process then moves on to step 507 and begins processing the next communication.

FIG. 6 is a flowchart illustrating an example method for training a machine learning model, wherein the model is configured to process communication recorded in controlled-environment facilities. The machine learning model may use one or more inputs as a training set. In step 601, data from human agent reviews is collected. The data from human agent reviews may comprise, for example, new keywords assigned to prior communications, an indication whether a prior communication was escalated by the human agent, and/or a verification of identity of an expected party to a communication.

In step 602, data is collected from an end-user interface. The data from the end-user interface may comprise, for example, search parameters entered by a user and/or search results selected by a user. In step 603, communications summaries are collected. The communication summaries may comprise, for example, topics or subject matter discussed in prior communications.

In step 604, one or more of the human agent reviews, end-user interface data, and/or communication summaries are provided as an input to the machine learning model. The model is configured to process the communications in accordance with current values of a set of model parameters to generate as output a proposed likelihood that the communication comprises suspicious content. In step 605, the machine learning model updates the values of the model parameters based on the inputs from the human agent reviews, end-user interface data, and/or communication summaries.

FIG. 7 is a diagrammatic illustration of a controlled-environment facility environment 700, wherein example embodiments of the present systems and methods for call classification and escalation using a machine learning system may be employed with respect to one or more controlled environment facilities 701, 702. An external, centralized communication processing system 703, onsite communication processing system 704, or the like may provide telephone services, videoconferencing, online chat, and other communication services to residents of respective controlled-environment facility 701, 702. As illustrated, in some cases, a communication processing system 704 may be co-located with a controlled-environment facility 702. Alternatively, as also illustrated a communication processing system 703 may be centrally or remotely located, in whole or in part, with respect to one or more controlled-environment facilities 701, 702, such as in a controlled-environment facility vendor datacenter 705, and may be connected to such facilities via a public or private network 706 (e.g., via a secure tunneling protocol over the internet, using encapsulation, an intranet, or other type of data network), and may provide communication services to such multiple controlled-environment facilities. More generally, however, it should be noted that communication systems 703, 704 may assume a variety of forms, including telephony switches such as electronic switching systems, or the like, and/or and may be configured to serve a variety of facilities and/or users, whether within or outside of a controlled-environment facility In addition to providing certain visitation and communication operations, communication processing systems 703, 704 may attempt to ensure that an inmate's electronic communications, such as calls, video conferences, online chats, etc. are performed only with non-residents whose identities, devices, email addresses, phone numbers, etc. are listed in that inmate's Personal Allowed Number (PAN) or Pre-Approved Contact (PAC) list. Each inmate's PAN or PAC list may be stored, for example, in a database maintained by controlled-environment facility vendor datacenter 705, centralized investigative data aggregation and analysis system 707, and/or the like. In addition to PAC and/or PAN list(s), controlled-environment facility vendor datacenter 705, centralized investigative data aggregation and analysis system 707, and/or the like, may also store Resident Profile Data (RPD), as well as communication and/or visitation rules applicable to each resident, Communication Detail Records (CDRs), or similar records, for resident electronic communications, such as phone calls, video visitations, texts, online chats, or the like. This controlled-environment facility vendor datacenter 705 and/or centralized investigative data aggregation and analysis system 707 database(s) may include information such as balances for resident trust and calling accounts; trial schedule; conviction data; criminal record; sentencing data, such as time served, time remaining to be served, and release date; cell and cellmate assignments; resident restrictions and warnings; commissary order history; telephone call history; call recordings; known or suspected gang or criminal affiliations; known or suspected affiliates, accomplices, or gang members; and any other information that may be relevant or useful to correctional facility staff to house and maintain residents. Controlled-environment facility resident account management system 708, which may be a separate system, or which may be a part or function of controlled-environment facility datacenter 705, as illustrated, may maintain resident accounts to the benefit of the respective resident, such as resident commissary accounts, resident communications accounts, which may be used to pay for purchase of a controlled-environment facility resident communication and/or media devices (e.g., 709, 710, 711, 712), communications, such as phone calls, video visitation, internet chats, emails, text messages, or the like.

Thereby, in some embodiments, the lives of inmates/residents may be electronically managed from booking through release, through facility management (including tracking inmates from booking through release), staff management (including time and attendance management and personnel dispatching), call management (including placing and blocking electronic communications, accounting for call charges, distance commerce, determining credit worthiness of individuals, establishing and maintaining accounts, and handling purchases of goods and services), and inmate management (including managing inmate information and tracking inmate activity). Other management systems may include public phone companies, cell phone forensics, internet service providers, visitation systems including video and non-video systems, postal services, email services, payment processors and the like.

Residents may use more-or-less conventional telephones 713, 714, or the like to access certain communication services, under control of respective communication processing system 704, 703, etc. Additionally, or alternatively, in some facilities a resident may use a video visitation device 715a through 715n, 716a through 716n, or the like, to place voice calls, as well as for video visitation, under control of respective communication processing system 704, 703, etc. Such a video visitation device may be referred to as an Intelligent Facility Device (IFD) 715, 716, which may be a video phone particularly adapted for use in a controlled-environment facility, but which may be used to place voice calls, as well. Alternatively, or additionally, IFDs may take the form of, or be used as, a voice phone that may have a touchscreen interface. Generally speaking, IFDs may be disposed in a visitation room, in a pod, as part of a kiosk, etc. Additionally, or alternatively, in some facilities, residents may also use a personal computer wireless device, such as a tablet computing device 710, 712, smartphone/media player 709, 711, or the like, which may have been adapted and/or approved for use in a controlled-environment facility. Such a tablet computing device or smartphone/media player may be referred to as an Intelligent Resident Device (IRD), or the like, and in a correctional institution embodiment, as an Intelligent Inmate Device (IID), or the like. As will be appreciated, IIDs, IFDs, or other similar devices, as well as phones 713, 714, etc. have communications capabilities, to enable a party to participate in electronic communications, such as telephone calls, video visitation sessions (video calls), or the like, with other call parties, such as non-residents, under control of respective communication processing system 704, 703, etc.

In some embodiments, IFDs 715, 716, etc. may be implemented as a computer-based system. For example, each of IFD may include a display, camera, and handset. The display may be any suitable electronic display such as, for example, a Liquid Crystal Display (LCD), a touchscreen display (e.g., resistive, capacitive, etc.), or the like, whereas the camera may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone). During a video visitation session, IFDs may be configured to capture a video image of a resident to be transmitted to a non-resident using the camera, and to display a video image of the non-resident to the resident using the display. IFDs may also be configured to capture an audio signal from the resident to be transmitted to a non-resident using the mouthpiece portion of the handset, during video visitation call or during a voice call. Complementarily, the IFD may provide an audio signal from the non-resident to the resident using the earpiece portion of the handset, during such calls. Additionally, or alternatively, audio received from the non-resident may be reproduced via a loudspeaker, and audio provided by the resident may be captured via a microphone.

IFDs may be a replacement for typical telephones provided in controlled-environment facilities, such as rehabilitation centers, jails, and prisons, utilizing existing facility telephony wiring. While the IFDs are illustrated in FIG. 7 as hardened, wall-mounted devices, IFDs may also take the form of a kiosk-type terminal or the like. In some cases, IFDs may assume the form of any computer, tablet computer, smart phone, etc., or any other consumer device or appliance with audio and/or video conferencing capabilities. For example, in a correctional facility environment a tablet computing device may be mounted on a wall, in a hardened case as an IFD. IFDs may replace a typical pay phone found in some facilities and may provide touch screen computer functionality that enables a resident to perform "self-service" tasks such as setting up doctor appointments, scheduling visitation, viewing schedules, and checking the status of his or her case. The intelligent facility device may include an RFID or biometric reader, or the like to enable precise identification of each resident. In addition, the intelligent facility device includes, as noted, a built-in camera and telephone handset to enable a resident to use video conferencing to meet face to face with attorneys, family, and friends. In accordance with embodiments of the present systems and methods, IFDs 715, 716, etc. may be employed to facilitate implementation of embodiments of the present systems and methods, and/or to carry out all or certain aspects of embodiments of the present systems and methods.

As noted, IIDs 710, 712, etc. may be tablet computing devices or smartphones/media players 709, 711, etc. adapted and/or approved for use by residents of the respective controlled-environment facility (within the controlled-environment facility) 701, 702. Each IRD may be particularly adapted for use in a controlled-environment. For example, in a correctional institution, jail, or the like, such an IID may be "stripped-down," particularly from the standpoint of what applications programs (apps) are provided or allowed on the IID, and/or connectivity afforded to the IID. By way of example, such an IRD may employ an operating system kernel that has been rebuilt for use in such a tablet computing device in a controlled-environment facility. For example, such an IRD may be adapted to only connect to a network provided by the controlled-environment facility, and/or in only certain locations, within the controlled-environment facility, such as may be controlled by availability of Wi-Fi access, or the like, only being available in certain areas, as discussed above. That is, for example, where access may be compartmentalized, leveraging the structure of the controlled-environment facility for example limiting the availability of a Wi-Fi signal providing the stream through the placement of wireless access points, antenna directionality of such wireless access points, and/or the like. Also, the IRD may have a few fixed apps pre-installed on the device, and installation of further apps on the device may be forbidden (i.e., prevented by modifications to the device's operating system, or the like) and/or restricted, such as by requiring permission from a facility administrator, or the like. Apps provided on an IRD might include apps of particular interest to residents of the controlled-environment facility. For example, an IID provided to inmates of correctional facilities, might include apps that may be of particular use to an inmate, in general, such as access to a legal research service, or of more specific interest, such as providing an inmate nearing release, access to employment searching apps or the like. Hence, such IIDs may be used to help soon to be released inmate's transition. For example, the IID may be used to communicate with a future employer, or the like. As such, IIDs may be sponsored, or otherwise subsidized by organizations or companies, assisting with the transition of inmates into society. As noted, in accordance with embodiments of the present systems and methods, IIDs may be used to communicate with others, such as through phone calls, video calls, or the like. To this end such IIDs 710, 712, 709, 711, etc. may include a preinstalled, non-removable app to facilitate implementation of embodiments of the present systems and methods, and/or to carry out all or certain aspects of embodiments of the present systems and methods.

To access communications services, a resident may initiate telephone services by lifting the receiver on telephone 713, 714, etc. or IFD 715, 716, etc. and/or otherwise initiating an electronic communication, such as by launching an applications program (app) on IRD 710, 712, 709, 711, etc. At which time, the resident may be prompted to provide a personal identification number (PIN), other identifying information or biometrics. An interactive voice response (IVR) unit (not shown, but which may be integrated into communications processing system 704 and/or 703, etc.) may generate and play prompts or other messages to the resident. Under the control of communication processing system 704 and/or 703, etc. the device may be capable of connecting to a non-resident's device (e.g. telephone 717, non-resident computer 718, non-resident tablet computing device 724, non-resident smartphone/media player 725, or the like) across public network 719, such as a publicly switched telephone network (PSTN), an Integrated Services Digital Network (ISDN), Voice-over-IP (VoIP) or packet data network, such as for example the Internet, etc. Network 719 may be the same, or a different network, as network 706. Telephony switch 720, 721, etc. in respective communication processing system 704, 703, etc. may be used to connect calls across a PSTN, such as calls from controlled-environment facility telephone 713 or 714 and non-resident telephone 717. Telephony router 722, 723, etc., media gateway functionality, or the like of respective communication system 704, 703, etc. may be used to route data packets associated with a digital call connection, via an Integrated Services Digital Network (ISDN), the Internet, or the like (i.e., network 719). For example, a non-resident party may have a personal or laptop computer 718 with a webcam, or the like, or devices 724 or 725 may have an integrated camera and display (e.g., a smart phone, tablet, etc.). A network connection between the parties may be established and supported by an organization or commercial service that provides computer services and software for use in telecommunications and/or VOIP, such as SKYPE®. Additionally, or alternatively, the correctional facility and/or the destination may use videoconferencing equipment compatible with ITU H.323, H.802, H.264, and/or V.80, or other suitable standards. In accordance with various embodiments of the present systems and methods, non-resident's devices, telephone 717, non-resident computer 718, non-resident tablet computing device 724, non-resident smartphone/media player 725, and/or the like, may be disposed in the non-resident's home, place of work, on their person, or the like. Additionally, or alternatively the non-resident devices may be disposed in a visitation area of controlled-environment facility 701, 702, etc., which may be within, adjacent to, or remote with respect controlled-environment facility 701, 702, etc., itself.

In some implementations, communication processing system systems 703 and/or 704, may be configured to perform communication monitoring operations, such being configured to monitor and or record communication sessions (e.g., as electronic audio/video files). In accordance with various embodiments of the present systems and methods, a controlled-environment communication apparatus that may carry out capture of dialed non-resident phone numbers, or the like, may take the form of central and/or onsite controlled-environment facility communication management system 703 and/or 704, respectively. That is, the present multiple controlled-environment facility investigative data aggregation and analysis system may employ the controlled-environment facility communications management systems (704 and 703) associated with at least one controlled-environment facility (701, 702 or) for capturing telephone number of non-residents dialed by each resident of the associated controlled-environment facility.

This telephone number may be called by the resident or the non-resident might otherwise use the telephone number to communication with the resident, such as via the respective controlled-environment facility communications management system 704 or 703 associated with the controlled-environment facility in which the resident resides 701, 702. For example, the controlled-environment facility communications management system 704 or 703 may capture the called telephone number of the non-resident associated with the resident when the resident calls the non-resident's telephone number. In another example, wherein the captured telephone number is a telephone number used by a non-resident to communicate with the resident, the number may be captured by controlled-environment facility communications management system 704 or 703 when the non-resident calls into a video visitation or other scheduled call, or in similar circumstances. In yet another example the resident or non-resident number may be captured as a result of an illicit electronic communication, such as an electronic communication from or to a contraband cell phone in the possession of an inmate/resident, to or from the non-resident.

Embodiments of the present systems and methods may employ a secure, web-based portal enabling individuals to store and transmit information, including forensic tools that analyze communications into and out of controlled-environment facilities, that assists law enforcement. Such a portal may be provided by centralized investigative data aggregation and analysis system 707, which may provide such investigative tools. Such investigative tools may provide collection, processing, analysis, and/or reporting of information for intelligence purposes. In some embodiments, the investigative tools may provide functions such as entity linkage analysis, communication statistics, organization analysis, communication behavior analysis, subscription usage analysis, common communication analysis, timelines, correlations, mapping, word search, language translation (whether machine translation or access to translation services), call recording (whether terminated external to the controlled-environment facility or internally thereto), electronic communication notification, electronic communication monitoring (whether real-time or recorded, and whether monitoring a particular electronic communication or a plurality of electronic communications), call barging, electronic communication control, visitation monitoring/background checking, crime tip conduit, account activity monitoring (whether tracing deposits and expenditures of monies or monitoring account trends and behavior, such as velocity of transactions), multiple database querying, and resource integration, and/or the like. One or more of these investigative tools may be provided through an intuitive user interface to provide ease of use, facilitate operation across a variety of user terminals, and/or to facilitate remote access to one or more features thereof. For example, in some cases, a web page (e.g., the aforementioned portal) having menus comprising an investigator dashboard may be provided, to present and facilitate execution of various investigative operations. These investigative tools may log calls (e.g., as CDRs), so that an investigator may research them through an archive and may be provided access to internal and/or external criminal databases and/or other sources of useful information.

Centralized investigative data aggregation and analysis system 707 is, in accordance with embodiments of the present systems and methods, configured to accept setup of alerts. Each such alert may be associated with particular data related to electronic communication, such as a particular controlled-environment facility resident dialed telephone number or other data related to electronic communications that may be associated with an individual controlled-environment facility resident associated with, or otherwise named, in the alert. In various embodiments, an alert can be activated based on a number of different of conditions. One such condition can be a series of dialed numbers, a GEO fence, a specific time frame in which these numbers are dialed, a combination of communications to specific contacts, or the like. Alerts may be set up to be sent only during certain times. This would allow personnel to only receive alerts while on duty. Alerts may be set up to in a tree format so that if personnel are off duty, the alert may be sent to the next person on duty. It may also allow multiple people based on the type of alert or any other condition. Personnel may opt in or out of alerts. Word spotting can additionally, or alternatively identify keywords in a communication, which may activate an alert in accordance with embodiments of the present systems and methods.

Centralized investigative data aggregation and analysis system 707 is also, in accordance with embodiments of the present systems and methods, configured to provide recorded resident communications to a machine learning system for communication classification and escalation 726, such as disclosed herein. The machine learning system for communication classification and escalation 726 may be a third-party or centralized entity or may be a component of centralized investigative data aggregation and analysis system 707.

Embodiments of the present systems and methods for call classification and escalation using a machine learning system as described herein may be implemented or executed, at least in part, by one or more computer systems. One such computer system is illustrated in FIG. 8. In various embodiments, computer system 800 may be a server, a mainframe computer system, a workstation, a network computer, a desktop computer, a laptop, a tablet computing device, media player, or the like. For example, in some cases, computer 800 may implement one or more steps of example processes described above with respect to FIGS. 5 and 6, and/or a computer system such as computer system 800 may be used as part of, one or more of: controlled environment facility communications management systems 703 and/or 705; centralized investigative data aggregation and analysis system 707; controlled-environment facility resident communications devices 709 through 716; non-resident communications devices 717, 718, 724, 725; and/or the like. In various embodiments two or more of these computer systems may be configured to communicate with each other in any suitable way, such as, for example, via a network.

As illustrated, computer system 800 includes one or more processors 801a-n coupled to a system memory 802 via bus 803. Computer system 800 further includes a network interface 810 coupled to bus 803, and one or more I/O controllers 804, which in turn are coupled to peripheral devices such as cursor control device 805, keyboard 806, display(s) 807, etc. Each of I/O devices 805, 806, 807 may be capable of communicating with I/O controllers 804, for example, via a wired connection (e.g., serial port, Universal Serial Bus port) or wireless connection (e.g., Wi-Fi, Bluetooth, Near Field Communications Link, etc.). Other devices may include, for example, microphones, antennas/wireless transducers, phone detection modules, etc.

In various embodiments, computer system 800 may be a single-processor system including one processor 801a, or a multi-processor system including two or more processors 801a-n (e.g., two, four, eight, or another suitable number). Processors 801 may be any processor capable of executing program instructions. For example, in various embodiments, processors 801 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 801 may commonly, but not necessarily, implement the same ISA. Also, in some embodiments, at least one processor 801 may be a graphics processing unit (GPU) or another dedicated graphics-rendering device.

System memory 802 may be configured to store program instructions and/or data accessible by processor 801. In various embodiments, system memory 802 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 802 as program instructions 808 and data storage 809, respectively. In other embodiments, program instructions and/or data may be received, sent, or stored upon different types of computer-accessible media or on similar media separate from system memory 802 or computer system 800.

A computer-accessible medium may include any tangible and/or non-transitory storage media or memory media such as electronic, magnetic, or optical media—e.g., disk or CD/DVD-ROM coupled to computer system 800 via bus 803. The terms "tangible" and "non-transitory," as used herein, are intended to describe a computer-readable storage medium (or "memory") excluding propagating electromagnetic signals but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 803 may be configured to coordinate I/O traffic between processor 801, system memory 802, and any peripheral devices in the computer system, including network interface 810 or other peripheral interfaces, such as I/O devices 805, 806, 807. In some embodiments, bus 803 may perform any necessary protocol, timing, or other data transformations to convert data signals from one component (e.g., system memory 802) into a format suitable for use by another component (e.g., processor 801). In some embodiments, bus 803 may include support for devices attached through various types of peripheral buses, such as a variant of the Peripheral Component Interconnect (PCI) bus standard or the Universal Serial Bus (USB) standard, for example. In some embodiments, the function of bus 803 may be split into two or more separate components, such as a northbridge chipset and a southbridge chipset, for example. In addition, in some embodiments some or all the functionality of bus 803, such as an interface to system memory 802, may be incorporated directly into processor(s) 801a-n.

Network interface 810 may be configured to allow data to be exchanged between computer system 800 and other devices attached to a network, such as other computer systems, or between nodes of computer system 800. In various embodiments, network interface 810 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 804 may, in some embodiments, enable communications with one or more display terminals, keyboards, keypads, touchpads, scanning devices, voice or optical recognition devices, mobile devices, or any other devices suitable for entering or retrieving data by one or more computer system 800. Multiple I/O controllers 804 may be present in computer system 800 or may be distributed on various nodes of computer system 800. In some embodiments, I/O devices may be separate from computer system 800 and may interact with one or more nodes of computer system 800 through a wired or wireless connection, such as over network interface 810.

As shown in FIG. 8, system memory 802 may include program instructions 808, configured to implement certain embodiments described herein, and data storage 809, comprising various data may be accessible by program instructions 808. In an embodiment, program instructions 808 may include software elements, which may be configured to affect the operations discussed in FIGS. 5 and 6. Program instructions 808 may be implemented in various embodiments using any desired programming language, scripting language, or combination of programming languages and/or scripting languages (e.g., C, C++, C #, JAVA®, JAVASCRIPT®, PERL®, etc.). Data storage 809 may include data that may be used in these embodiments (e.g., recorded communications, profiles for different modes of operations, etc.). In other embodiments, other or different software elements and data may be included.

In an example embodiment, a computer-implemented method comprises obtaining metadata for a communication, obtaining features of the content in the communication, and determining from the metadata and or a communication transcript, using a machine learning model, a likelihood that the communication comprises suspicious content or a topic of interest. The method may further comprise, if the likelihood that the communication comprises suspicious content or topic of interest is at or above a predetermined threshold, then marking the communication for review by a human agent; and if the likelihood that the communication comprises suspicious content or topic of interest is below a predetermined threshold, then ignoring the communication for further review. A communication is determined to have suspicious content or topic of interest, for example, based upon the presence of one or more keywords in the communication transcript. The presence of the one or more keywords may be taken either alone or combined with metadata or other features of the content in the communication. The one or more keywords may be associated with illegal or unauthorized items, activities, or behaviors. The metadata may be associated with at least one of a communication parameter and a party to the communication.

The method may further comprise providing data from human agent reviews of prior communications as an input to the machine learning model, wherein the model is configured to process the communication in accordance with current values of a set of model parameters to generate as output a proposed likelihood that the communication comprises suspicious content. The data from human agent reviews may comprise one or more of new keywords assigned to prior communications, an indication whether a prior communication was escalated by the human agent, and whether the suspicious content or topic of interest produced by the machine learning system was confirmed.

The method may further comprise providing data from an end-user interface as an input to the machine learning model, wherein the model is configured to process the communications in accordance with current values of a set of model parameters to generate as output a proposed likelihood that the communication comprises suspicious content or a topic of interest. The data from the end-user interface may comprise search parameters entered by a user and/or search results selected by a user.

The method may further comprise providing one or more communication summaries as an input to the machine learning model, wherein the model is configured to process the communications in accordance with current values of a set of model parameters to generate as output a proposed likelihood that the communication comprises suspicious content or topic of interest. The one or more communication summaries may comprise topics or subject matter discussed in prior communications.

In another example embodiment, a method performed by one or more data processing apparatuses comprises obtaining data from human agent reviews of communications recorded in one or more controlled-environment facilities; and providing the data from human agent reviews as an input to a machine learning model, wherein the model is configured to process communications recorded in controlled-environment facilities in accordance with current values of a set of model parameters to determine a likelihood that the communications comprise suspicious content or topics of interest. The machine learning model determines the likelihood of suspicious content based upon metadata and transcripts associated with the communications and/or based upon video images associated with the communications The method may further comprise, if the likelihood that the communication comprises suspicious content or topic of interest is at or above a predetermined threshold, then sending the communication to a human agent for review; and if the likelihood that the communication comprises suspicious content or topic of interest is below the predetermined threshold, then dropping the communication from further review.

The data from human agent reviews may comprise one or more of new keywords assigned to prior communications, an indication whether a prior communication was escalated by the human agent, and an indication whether an expected party to a prior communication was confirmed. A communication may be determined to have suspicious content or a topic of interest based upon the presence of one or more keywords in a communication transcript or based upon detection of events in a participant video stream.

The method may further comprise providing data from an end-user interface as an input to the machine learning model, wherein the data from the end-user interface comprises one or more of search parameters entered by a user and search results selected by the user.

The method may further comprise providing one or more communication summaries as an input to the machine learning model, wherein the one or more communication summaries comprise topics or subject matter discussed in prior communications.

A person of ordinary skill in the art will appreciate that computer system 800 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various operations described herein may be implemented in software executed by processing circuitry, hardware, or a combination thereof. Programming may take the form of stored program instructions, programed firmware, or the like, while hardware might take the form of an Application Specific Integrated Circuit (ASIC), or the like, to carry out such aspects of embodiments of the present systems and methods. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A computer-implemented method comprising:
   obtaining metadata for a communication;
   obtaining features of the content in the communication;
   determining from the metadata and or a communication transcript, using a machine learning model, a likelihood that the communication comprises suspicious content or a topic of interest; and
   providing one or more communication summaries as an input to the machine learning model, wherein the model is configured to process the communications in accordance with current values of a set of model parameters to generate as output a proposed likelihood that the communication comprises suspicious content or topic of interest.

2. The computer-implemented method of claim 1, further comprising:
   if the likelihood that the communication comprises suspicious content or topic of interest is at or above a predetermined threshold, then marking the communication for review by a human agent; and
   if the likelihood that the communication comprises suspicious content or topic of interest is below a predetermined threshold, then ignoring the communication for further review.

3. The computer-implemented method of claim 1, wherein a communication is determined to have suspicious content or topic of interest based upon the presence of one or more keywords in the communication transcript.

4. The computer-implemented method of claim 1, wherein a communication is determined to have suspicious content or a topic of interest based upon the presence of one or more keywords in the communication transcript either alone or combined with metadata or other features of the content in the communication.

5. The computer-implemented method of claim 3, wherein the one or more keywords are associated with illegal or unauthorized items, activities, or behaviors.

6. The computer-implemented method of claim 4, wherein the metadata is associated with at least one of a communication parameter and a party to the communication.

7. The computer-implemented method of claim 1, further comprising:
   providing data from human agent reviews of prior communications as an input to the machine learning model, wherein the model is configured to process the communication in accordance with current values of a set of model parameters to generate as output a proposed likelihood that the communication comprises suspicious content.

8. The computer-implemented method of claim 7, wherein the data from human agent reviews comprise one or more of new keywords assigned to prior communications, an indication whether a prior communication was escalated by the human agent, and whether the suspicious content or topic of interest produced by the machine learning system was confirmed.

9. The computer-implemented method of claim 1, further comprising:
   providing data from an end-user interface as an input to the machine learning model, wherein the model is configured to process the communications in accordance with current values of a set of model parameters to generate as output a proposed likelihood that the communication comprises suspicious content or a topic of interest.

10. The computer-implemented method of claim 9, wherein the data from the end-user interface comprises search parameters entered by a user.

11. The computer-implemented method of claim 9, wherein the data from the end-user interface comprises search results selected by a user.

12. The computer-implemented method of claim 1, wherein the one or more communication summaries comprise topics or subject matter discussed in prior communications.

13. A method performed by one or more data processing apparatuses, the method comprising:
   obtaining data from human agent reviews of communications recorded in one or more controlled-environment facilities; and
   providing the data from human agent reviews as an input to a machine learning model, wherein the model is configured to process communications recorded in controlled-environment facilities in accordance with current values of a set of model parameters to determine a likelihood that the communications comprise suspicious content or topics of interest, wherein the communications are determined to have suspicious content or a topic of interest based upon detection of events in a participant video stream.

14. The method of claim 13, wherein the machine learning model determines the likelihood of suspicious content based upon metadata and transcripts associated with the communications.

15. The method of claim 13, wherein the machine learning model determines the likelihood of suspicious content based upon video images associated with the communications.

16. The method of claim 13, further comprising:
   if the likelihood that the communication comprises suspicious content or topic of interest is at or above a predetermined threshold, then sending the communication to a human agent for review; and
   if the likelihood that the communication comprises suspicious content or topic of interest is below the predetermined threshold, then dropping the communication from further review.

17. The method of claim 13, wherein the data from human agent reviews comprise one or more of new keywords assigned to prior communications, an indication whether a prior communication was escalated by the human agent, and an indication whether an expected party to a prior communication was confirmed.

18. The method of claim 13, wherein a communication is determined to have suspicious content or a topic of interest based upon the presence of one or more keywords in a communication transcript.

19. The method of claim 13, further comprising:
providing data from an end-user interface as an input to the machine learning model, wherein the data from the end-user interface comprises one or more of search parameters entered by a user and search results selected by the user.

20. A method performed by one or more data processing apparatuses, the method comprising:
obtaining data from human agent reviews of communications recorded in one or more controlled-environment facilities;
providing the data from human agent reviews as an input to a machine learning model, wherein the model is configured to process communications recorded in controlled-environment facilities in accordance with current values of a set of model parameters to determine a likelihood that the communications comprise suspicious content or topics of interest; and
providing one or more communication summaries as an input to the machine learning model, wherein the one or more communication summaries comprise topics or subject matter discussed in prior communications.

\* \* \* \* \*